US012027287B2

(12) United States Patent
Hudson et al.

(10) Patent No.: US 12,027,287 B2
(45) Date of Patent: Jul. 2, 2024

(54) INSULATED ELECTRIC CORD

(71) Applicant: GRIPPLE LIMITED, Sheffield (GB)

(72) Inventors: James Hudson, Sheffield (GB); Mark Kimberley, Sheffield (GB)

(73) Assignee: GRIPPLE LIMITED (GB)

( * ) Notice: Subject to any disclaimer, the term of this patent is extended or adjusted under 35 U.S.C. 154(b) by 0 days.

(21) Appl. No.: 17/621,888

(22) PCT Filed: Jul. 13, 2020

(86) PCT No.: PCT/IB2020/056546
§ 371 (c)(1),
(2) Date: Dec. 22, 2021

(87) PCT Pub. No.: WO2021/009652
PCT Pub. Date: Jan. 21, 2021

(65) Prior Publication Data
US 2022/0254545 A1 Aug. 11, 2022

(30) Foreign Application Priority Data

Jul. 15, 2019 (GB) ..................................... 1910139
Jul. 16, 2019 (GB) ..................................... 1910202
Jul. 9, 2020 (GB) ..................................... 2010526

(51) Int. Cl.
*H01B 7/40* (2006.01)
*F21S 8/06* (2006.01)
(Continued)

(52) U.S. Cl.
CPC .............. *H01B 7/221* (2013.01); *F21S 8/061* (2013.01); *H01B 7/04* (2013.01); *H01B 7/385* (2013.01); *H01B 7/40* (2013.01)

(58) Field of Classification Search
CPC .......... H01B 7/40; H01B 7/385; H01B 7/223; H02G 1/14
See application file for complete search history.

(56) References Cited

U.S. PATENT DOCUMENTS 8,350,163 B2 * 1/2013 Auray ........................ F16L 5/00 174/665
8,931,936 B1 1/2015 Tham et al.
(Continued)

FOREIGN PATENT DOCUMENTS

DE 1017230 B 10/1957
GB 2502870 A 12/2013

*Primary Examiner* — Chau N Nguyen
(74) *Attorney, Agent, or Firm* — Clark Hill PLC; James R. Foley

(57) ABSTRACT

An insulated electric cord (102) comprises an elongate covering arrangement (12) and at least two elongate electrical conductors (14, 16) held within the covering arrangement (12). The insulated electric cord (102) further comprises an elongate load bearing member (20) held within the covering arrangement (12). The insulated electric cord (102) further comprises an elongate flexible cutting member (22) held within the covering arrangement (12). The elongate electrical conductors (14, 16), the elongate load bearing member (20), and the elongate flexible cutting member (22) extend longitudinally through the covering arrangement (12). The elongate flexible cutting member (22) extends through the covering arrangement (12) adjacent the elongate load bearing member (20). The cutting member (22) is capable of cutting the covering arrangement (12), thereby allowing a portion of the load bearing member (20) to be extracted from the covering arrangement (12).

17 Claims, 16 Drawing Sheets

(51) Int. Cl.

| | |
|---|---|
| ***H01B 7/04*** | (2006.01) |
| ***H01B 7/22*** | (2006.01) |
| ***H01B 7/38*** | (2006.01) |
| ***H02G 1/14*** | (2006.01) |

(56) References Cited

U.S. PATENT DOCUMENTS

| | | | | |
|---|---|---|---|---|
| 2007/0097667 | A1* | 5/2007 | Armstrong ............... | H02G 3/20 362/101 |
| 2008/0074893 | A1* | 3/2008 | Ham ........................ | F21V 21/38 362/403 |
| 2010/0018711 | A1 | 1/2010 | James et al. | |
| 2012/0018212 | A1 | 1/2012 | Wu et al. | |
| 2015/0357085 | A1 | 12/2015 | Kinsey | |

* cited by examiner

Fig 2
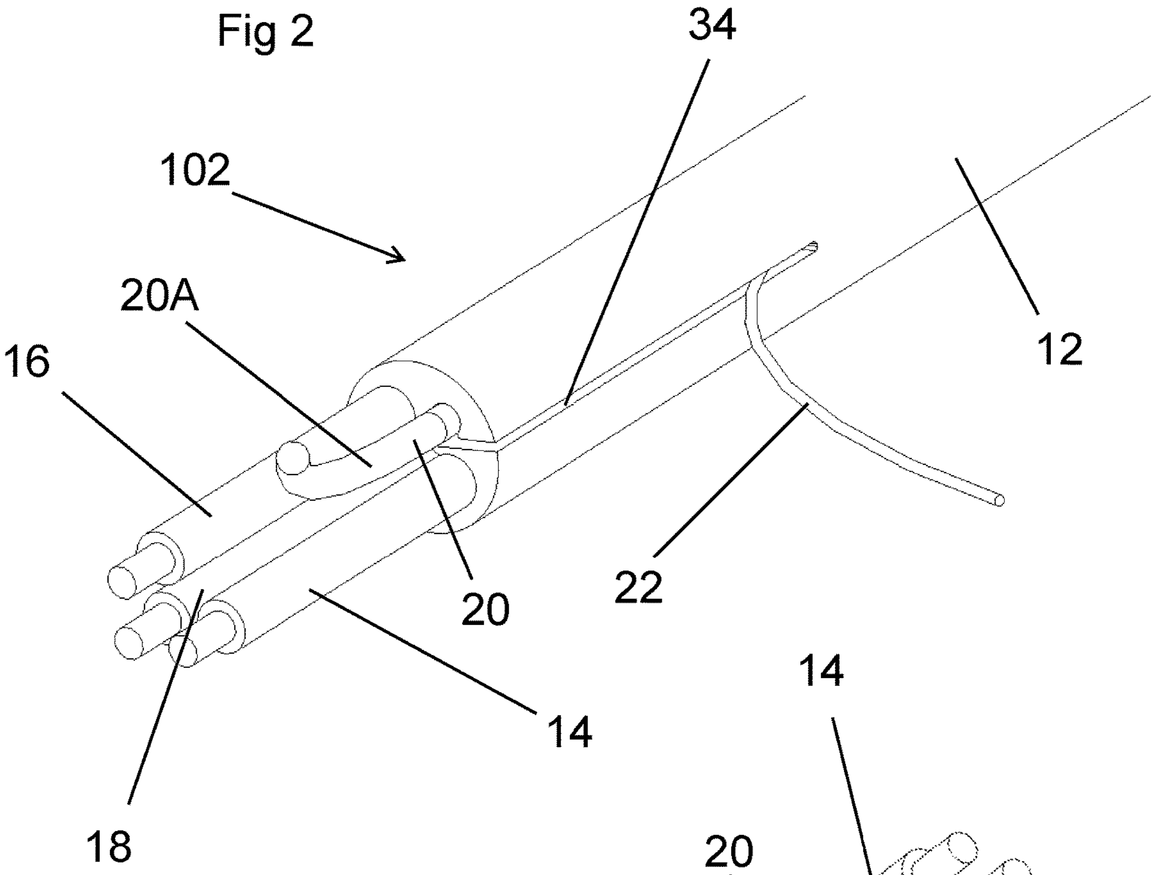
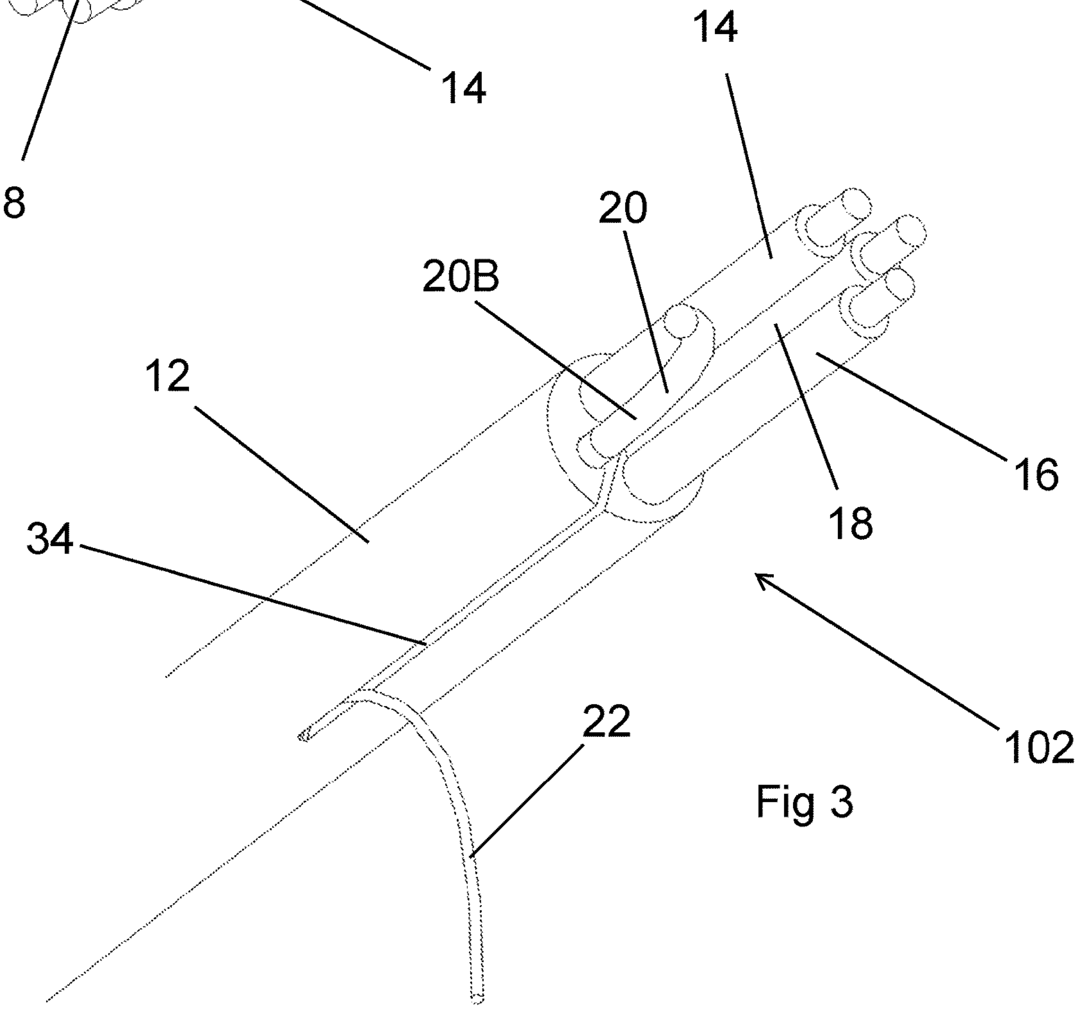
Fig 3

INSULATED ELECTRIC CORD

This invention relates to insulated electric cords. More particularly, but not exclusively, this invention relates to flexible insulated electric cords. Embodiments of the invention relate to flexible electric cords for supporting loads. This invention also relates to electrical apparatus and to methods of installing electrical devices.

A standard insulated electrical flexible cord comprises conductors to carry the current, insulating material to prevent the conductors coming into electrical contact with one another, and an insulating sheath material to protect the insulating material. Some electric cords can be used to suspend light fittings from ceilings, providing the light fittings do not exceed a maximum weight. Other electric cords have an embedded load bearing member that can be used to cut open the insulating sheath as well as bearing the load of the light fitting. However, the present inventors have realised that such cords have the problem that the load bearing member curls up when extracted from the insulating sheath.

According to one aspect of this invention, there is provided an insulated electric cord comprising:

an elongate covering arrangement;

at least two elongate electrical conductors held within the covering arrangement, the elongate electrical conductors extending longitudinally through the covering arrangement;

an elongate load bearing member held within the covering arrangement, the elongate load bearing member extending longitudinally through the covering arrangement;

an elongate flexible cutting member held within the covering arrangement, the elongate flexible cutting member extending longitudinally through the covering arrangement adjacent the elongate load bearing member;

wherein the cutting member is capable of cutting the covering arrangement, thereby allowing a portion of the load bearing member to be extracted from the covering arrangement.

The cutting member may cut an end region of the covering arrangement. The portion of the load bearing member so extracted may be an end portion of the load bearing member.

According to another aspect of this invention, there is provided an insulated electric cord for suspending an electrical device from a carrying member, said insulated electric cord comprising:

an elongate covering arrangement;

at least two elongate electrical conductors for electrically connecting the electrical device to wiring of a mains supply of electricity at the carrying member, the elongate electrical conductors being held within the covering arrangement and the elongate electrical conductors extending longitudinally through the covering arrangement;

an elongate load bearing member having first and second opposite end portions, the first end portion being securable to a first connector of the device, and the second end portion being securable to a second connector of the carrying member, the load bearing member being held within the covering arrangement and the load bearing member extending longitudinally through the covering arrangement;

an elongate flexible cutting member held within the covering arrangement, the cutting member extending adjacent the elongate load bearing member longitudinally through the covering arrangement; and wherein the cutting member is capable of cutting opposite end regions of the covering arrangement, thereby allowing the first and second opposite end portions of the load bearing member to be extracted from the covering arrangement and connected respectively to the aforesaid load bearing connectors.

According to yet another aspect of this invention, there is provided an electrical apparatus comprising:

an insulated electric cord as described above;

an electrical device having a first connector, and a carrying member having a second connector;

the first and second elongate electrical conductors connecting the electrical device to wiring of a mains supply of electricity at the carrying member;

the elongate load bearing member being connected at the first end portion thereof to the first connector of the device and said elongate load bearing member being connected at the second opposite end portion thereof to the second connector of the carrying member.

According to a yet further aspect of this invention, there is provided a method of installing an electrical device using an insulated electric cord as described above, said method comprising:

providing a first connector for an electrical device;

providing a carrying member;

providing a second connector;

cutting a portion of the covering at the first end portion of the load bearing member using the cutting member;

extracting the first end portion of the load bearing member from the covering arrangement; and securing the first end portion of the load bearing member to the first connector;

cutting a portion of the covering at the opposite second end portion of the load bearing member using the cutting member;

extracting the second end portion of the load bearing member from the covering arrangement;

securing the second end portion of the load bearing member to the second connector; and thereafter electrically connecting the first and second elongate electrical conductors to a supply of electricity at the carrying member.

The second connector may be provided on the carrying member. The method may comprise electrically connecting the first and second elongate electrical conductors to the electrical device. The step of electrically connecting the first and second elongate electrical conductors to the electrical device may be effected after the steps of securing the first and second end portions of the load bearing member to the first and second connectors.

The insulated electric cord may comprise a flexible insulated electric cord. The covering arrangement may be an elongate insulating sheath.

The covering arrangement may be flexible. The covering arrangement may have a substantially circular cross-sectional end profile.

The covering arrangement may define an elongate cavity extending longitudinally through the covering arrangement. The elongate electrical conductors may extend through the elongate cavity.

The insulated electric cord may include a third elongate electrical conductor held within the covering arrangement. Each elongate conductor may be embedded in the material of the covering arrangement. The third elongate electrical conductor may extend through the elongate cavity.

The flexible cutting member may extend through the covering arrangement adjacent the load bearing member. The flexible cutting member may be provided between the load bearing member and the electrical conductors.

The covering arrangement may have a longitudinal central axis. The load bearing member may extend through the covering arrangement offset from the central axis of the covering arrangement.

The flexible cutting member may be provided between the load bearing member and the centre of the covering arrangement. The flexible cutting member may be provided between the load bearing member and the elongate cavity.

The elongate cavity may have a generally triangular end profile. Each of the conductors may be provided at a respective apex of the triangle. The central axis may extend through the cavity.

Each conductor may comprise an elongate electrically conductive core, which may be formed of a metal, such as copper. Each conductor may comprise an elongate insulator extending around the electrically conductive core. The insulator may be formed of a synthetic material, which may be a resilient synthetic material, such as a polymer material. Each insulator may be plastically deformable. The synthetic material may comprise PVC.

The load bearing member may be a wire rope, such as a 7×7 wire rope.

The insulating sheath may be formed of a synthetic material, which may be electrically insulating and may be a resilient synthetic material, such as a polymer material. The insulating sheath may be plastically deformable.

The first connector may comprise a first non-electrical load bearing connector.

The first connector may comprise a clamping arrangement. The clamping arrangement may comprise a body defining a main passage in which one of the end portions of the load bearing member can be received, for example the first end portion of the load bearing member. A clamping member may be provided in the body to clamp the load bearing member in the main passage, thereby securing the electric cord to the first connector.

The clamping member may be screwed into a clamping passage in the body. The clamping passage may communicate with the main passage, thereby allowing the clamping member to engage the load bearing member.

The clamping passage may extend transverse to the main passage. The clamping passage may extend at a right angle to the main passage. The clamping passage may be threaded. The clamping member may be a screw that can be screwed into the clamping passage. The clamping member may be a grub screw.

The body may define at least one conductor receiving passage for receiving the electrical conductors. The body may include securing formations for securing the body to the electrical device. The securing formations may be threads on which a nut can be threaded to secure the first connector to the electrical device. The electrical device may be a lighting device, or other suitable electrical device.

The second connector may comprise a second non-electrical load bearing connector. The second connector may comprise a gripping arrangement. The second connector may comprise a main part, which may define a channel to receive one of the end portions of the load bearing member, for example the second end portion of the load bearing member. The second connector may comprise a gripping member held within the channel. The second connector may comprise an urging member for urging the gripping member to a gripping position in engagement with the load bearing member.

The second connector may include a plurality of gripping members, for example two or three gripping members, which may be urged by the urging member into the gripping position in which each gripping member engages the load bearing member.

The second connector may comprise a release member for releasing the load bearing member from the second connector. The release member can be pressed by a user to release the load bearing member from the second connector.

The release member may be capable of being pressed by a user to release the, or each, gripping member from engagement with the load bearing member. The release member can be pressed by a user to move the, or each, gripping member to a non-gripping position. In the non-gripping position, the, or each, gripping member may be released from engagement with the load bearing member.

The second connector may comprise a holder for holding the, or each, gripping member. The release member may be provided on the holder. The release member may be depressed by a user to move the holder, thereby moving the, or each, gripping member to the non-gripping position.

The main part may include securing formations for securing the main part to the carrying member. The securing formations may be threads on which a nut can be threaded to secure the second connector to the carrying member.

The carrying member may comprise a bracket. The carrying member may have an attaching formation to allow the carrying member to be attached to a support. The support may be, for example, a ceiling of a building or a beam in the roof of a building. The attaching formation may cooperate with an attaching member, such as a screw.

The attaching formation may be an aperture defined by the carrying member. The attaching member may be inserted through the attaching formation into the support.

The carrying member may have two of the attaching formations. A respective one of the attaching members may be provided for each attaching formation.

The carrying member may comprise a recessed attaching portion for attaching the carrying member to the support. The attaching formation may be provided at the attaching portion. The attaching formation may be an aperture defined by the attaching portion.

The carrying member may comprise two of the recessed attaching portions. A respective one of the attaching formations may be provided at each attaching portion. The, or each, of the attaching portion may comprise a substantially planar member.

The carrying member may have a securing portion, which may be a central securing portion. The securing portion may comprise a substantially planar member.

The securing portion may be spaced from the, or each, attaching portion. The securing portion may be spaced from the support, in use. In the embodiment described herein, the spacing of the securing portion from the, or each, attaching portion provides the advantage that it allows the second connector to be secured thereto.

A respective bridging portion may extend between the, or each, attaching portion and the securing portion. Each bridging portion may comprise a substantially planar member.

Each bridging portion may extend transverse to the attaching and securing portions. Each bridging portion may extend substantially at a right angle to the securing and attaching portions.

The carrying member may further include an end member at each opposite end thereof. A hole may be defined by each end member. A respective fastening member may be provided in each of the holes.

The second connector may be received through the securing portion and secured thereto by means of the main part and the nut screwed thereon. The main part of the second connector may have a flange member extending radially outwardly therefrom. The nut may be screwed onto the main part to engage the carrying member at the securing portion.

The method may comprise securing the carrying member to the support. The support may be a raised support. After the steps of securing the first and second end portions of the load bearing member to the first and second connectors, the method may comprise suspending the electrical device from the carrying member attached to the support.

The method may comprise securing the load bearing member to the first connector. The step of securing the load bearing member to the first connector may comprise clamping the load bearing member with the clamping member.

The method may comprise securing the load bearing member to the second connector. The step of securing the load bearing member to the second connector may comprise feeding the load bearing member into the second connector and allowing the, or each, gripping member to grip the load bearing member.

The method may comprise releasing the load bearing member from the second connector. The step of releasing the load bearing member from the second connector may comprise pressing the release member. The step of pressing the release member may release the gripping members from engagement with the load bearing member, thereby releasing the load bearing member to allow adjustment of the position of the load bearing member relative to the second connector.

The electrical apparatus may comprise a canopy that is arrangeable over the carrying member.

The canopy may be fastened to the carrying member after the load bearing member is connected to the second connector. The canopy may be in the form of a shallow cylinder. The canopy may have a side wall, which may be cylindrical. The canopy may have a base member, which may be circular. The side wall may have recesses, which may be L-shaped, to receive the fastening member. The fastening members may be tightened onto the canopy to fasten the canopy to the carrying member.

An embodiment of the invention will now be described by way of example only, with reference to the accompanying drawings, in which:

FIG. 2 is a perspective view showing an end region of the insulated electric cord;

FIG. 3 is a perspective view showing an opposite end region of the insulated electric cord;

Figure 1:
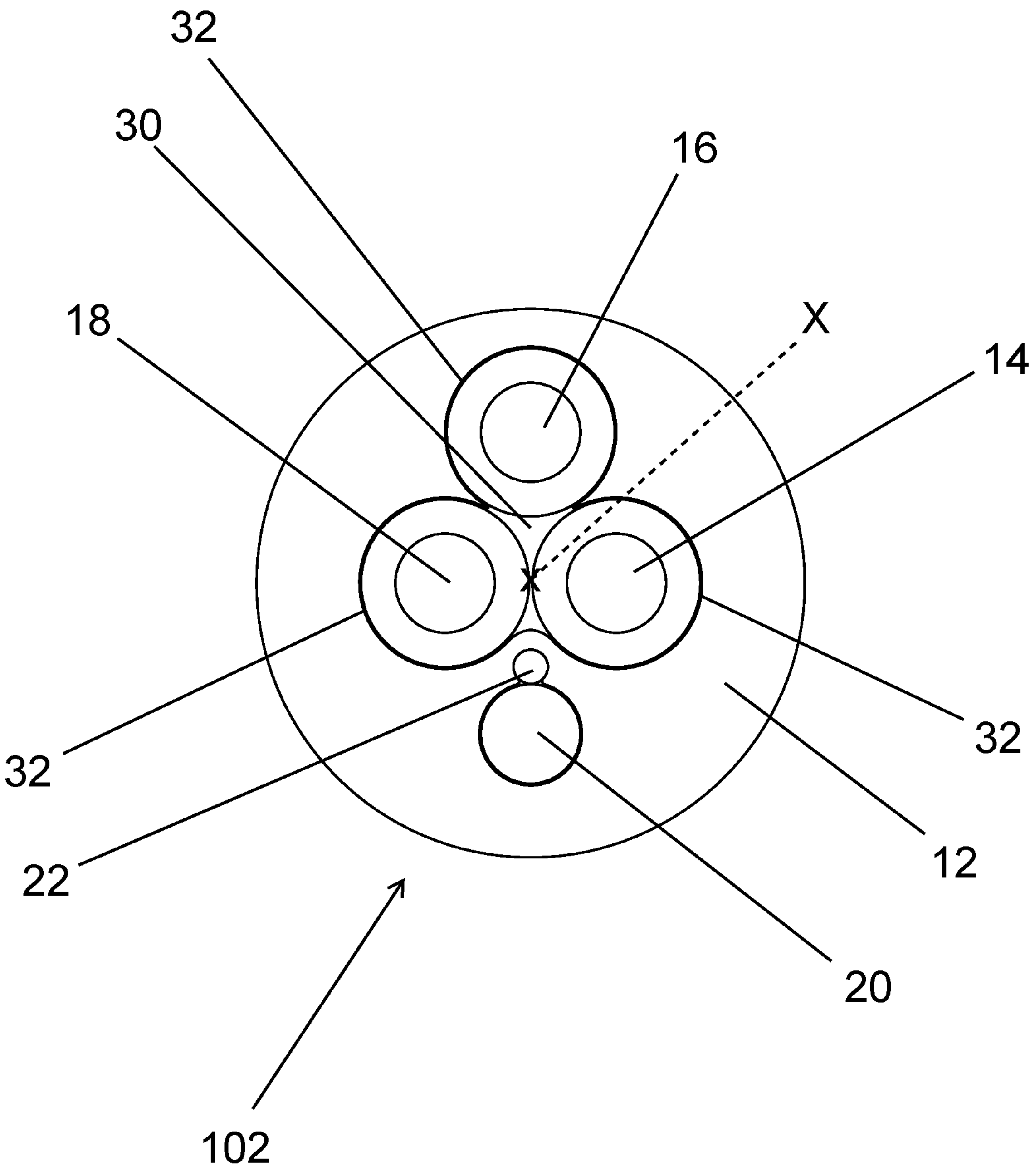
FIG. 1 is an end view of an insulated electric cord.
Figure 4:
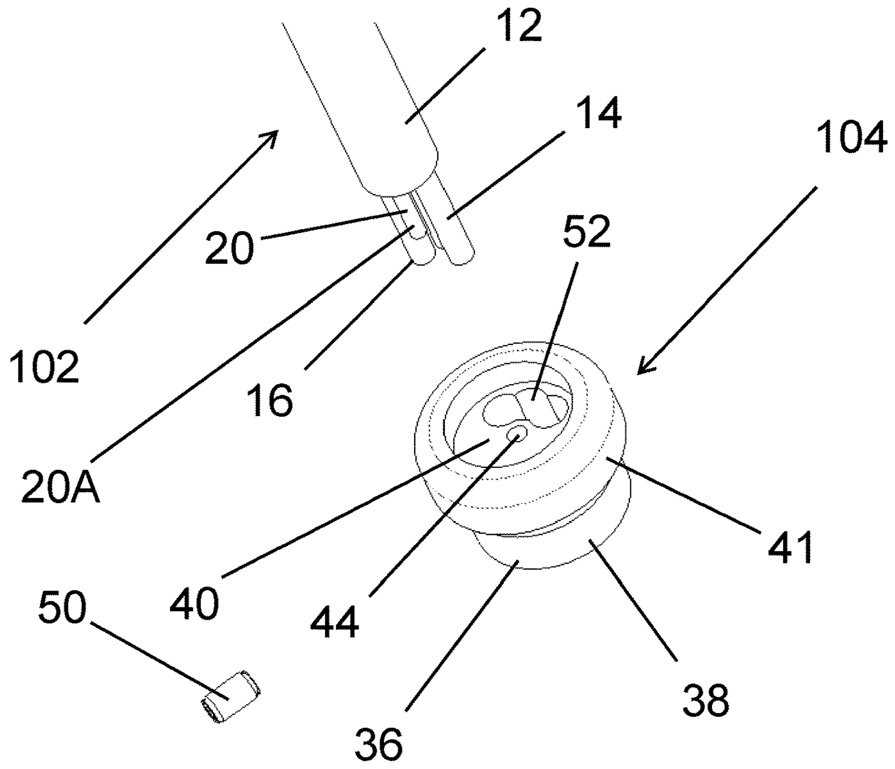
FIG. 4 is a perspective view showing a first step in the connection of the insulated electric cord with a first connector.
Figure 5:
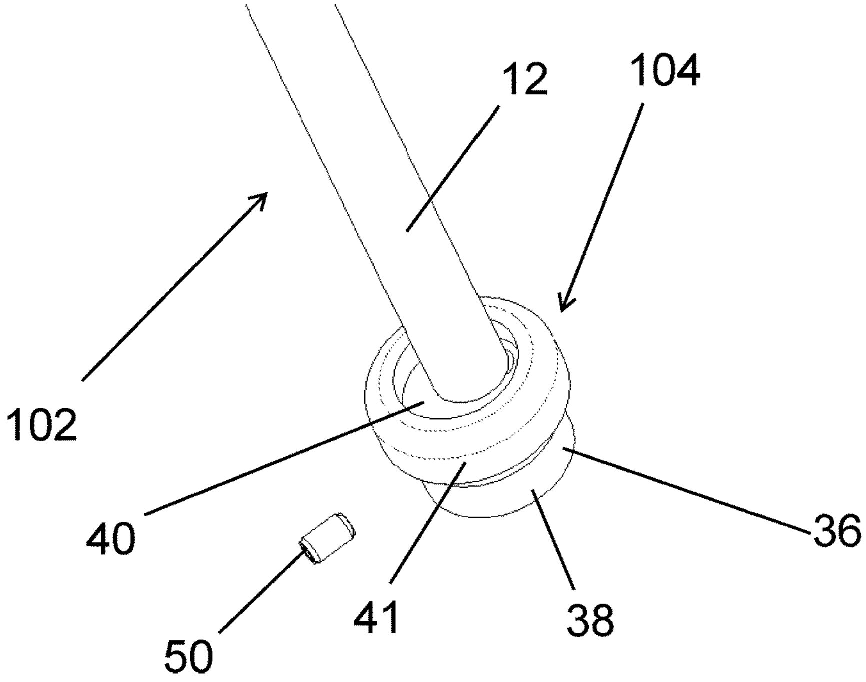
FIG. 5 is a perspective view showing a second step in the connection of the insulated electric cord with a first connector.
Figure 6:
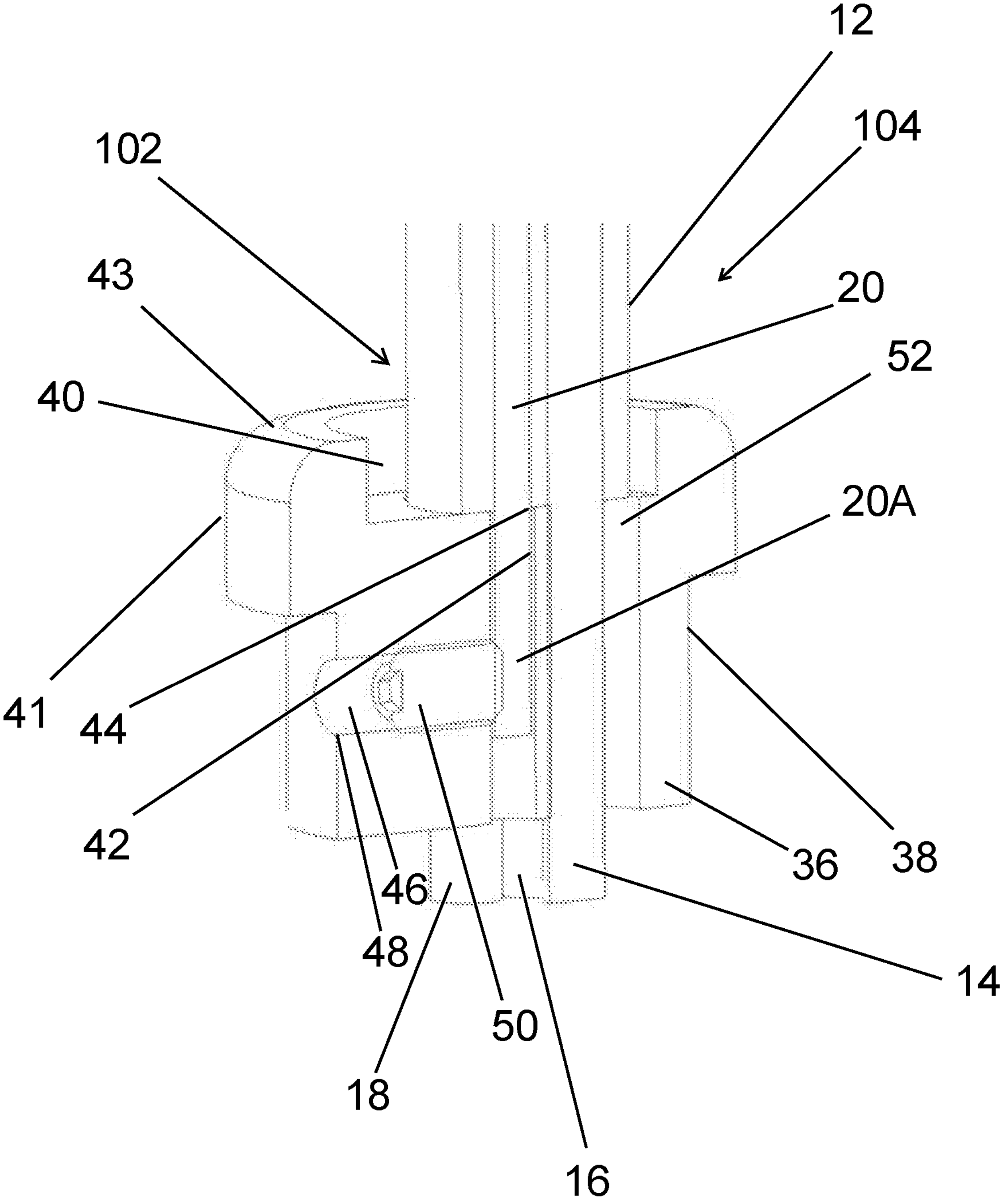
FIG. 6 is a sectional view showing a third step in the connection of the insulated electric cord with a first connector.
Figure 7:
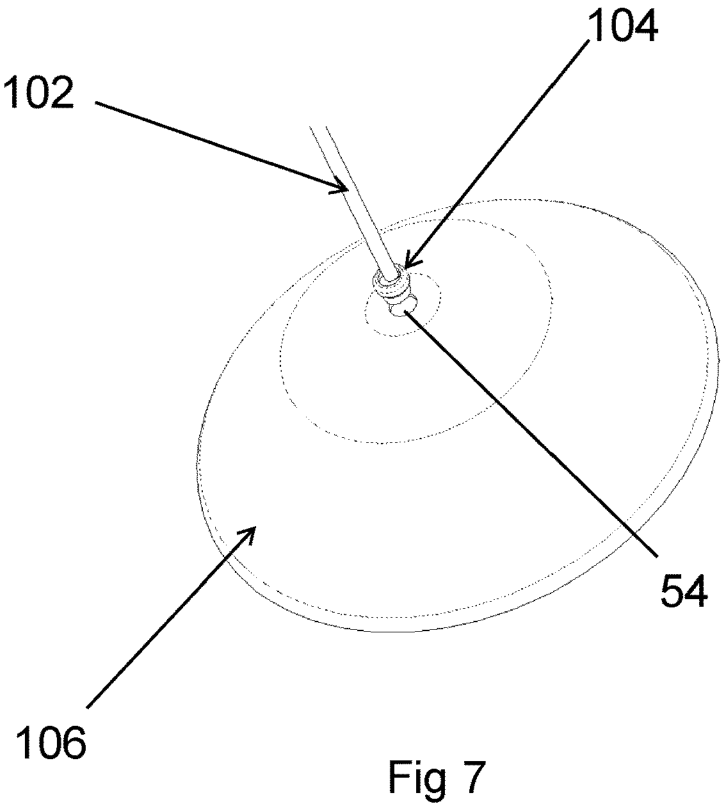
FIG. 7 is a top perspective view showing the first connector about to be connected to an electrical device.
Figure 8:
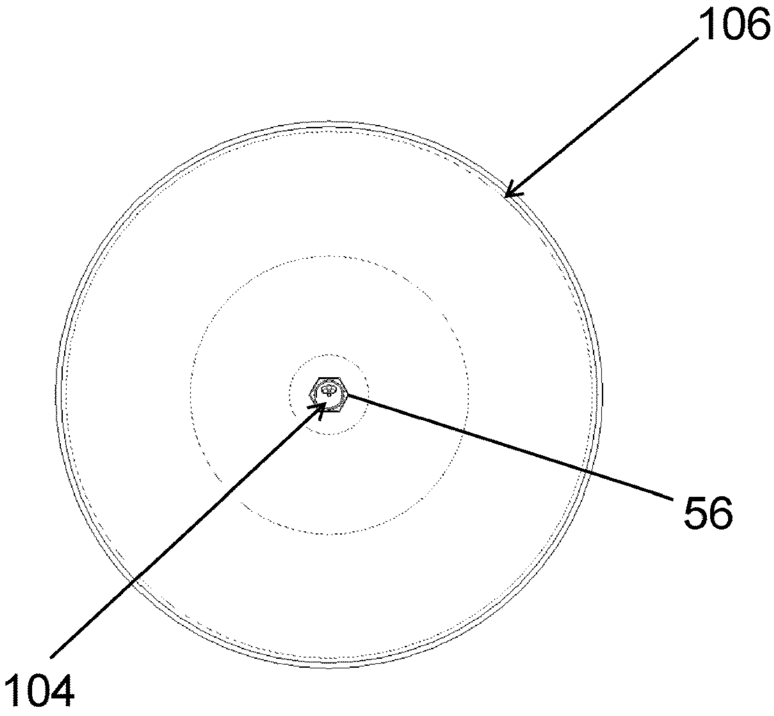
FIG. 8 is a bottom view showing the first connector connected to the electrical device.

The drawings show an electrical apparatus 100 comprising a flexible insulated electric cord 102, and a first connector 104 for connecting the insulated electric cord 102 to an electrical device 106. The electrical device disclosed in this specification is a lighting device, such as a lamp, but could be in the form of other electrical devices.

The electrical apparatus 100 further comprises a second connector 108 for connecting the insulated electric cord 102 to a carrying member 110 secured to a support 112 in the form of, for example, a ceiling or roof beam.

The flexible insulated electric cord 102 is shown in FIG. 1 of the drawings. The insulated electric cord 102 comprises a flexible elongate covering arrangement in the form of an insulating sheath 12 formed of a suitable plastically deformable synthetic material, such as PVC.

The insulating electrical cord 102 further comprises three electrically insulating elongate conductors 14, 16, 18, respectively, a live wire, a neutral wire, and a ground wire. The three conductors 14, 16, 18 are embedded within the flexible insulating sheath 12.

The insulating electrical cord 102 also includes an elongate load bearing member 20, embedded within the insulating sheath 12. The conductors 14, 16, 18 and the load bearing member 20 extend longitudinally through the whole length of the insulating sheath 12.

The load bearing member 20 comprises a plurality of elongate strands of a load bearing material, such as steel. The elongate strands are wound around one another to form a wire.

The insulating sheath 12 has a central axis X, and defines an elongate longitudinally extending cavity 30 around the central axis X. The conductors 14, 16, 18 are provided within the elongate cavity 30. The elongate cavity 30 extends longitudinally through the whole length of the insulating sheath 12.

The elongate cavity 30 has a generally triangular cross-sectional end profile, and has part circular elongate recesses 32 at each apex of the triangle. The conductors 14, 16, 18 are held within a respective one of the recesses 32. The conductors 14, 16, 18 are arranged at the apexes of the cavity 30.

An elongate cutting member 22 is embedded within the insulating sheath 12 between the load bearing member 20 and the cavity 30.

The insulating electrical cord 102 is manufactured so that the opposite ends of the cutting member 22 extend from the opposite ends of the insulating sheath 12.

Referring to FIG. 2, one end of the cutting member 22 can be held by the user and pulled against the insulating sheath 12, thereby cutting through the insulating sheath 12 from the inside thereof. The cutting of the insulating sheath 12 in this way forms a slit 34 along the end region of the insulating sheath 12. A first end portion 20A of the load bearing member 20 can be extracted from within the insulating sheath 12 through the slit 34.

Referring to FIG. 3, the above discussed cutting of the insulating sheath 12 can then be repeated at the opposite end of the insulating sheath 12, thereby allowing the opposite second end portion 20B of the load bearing member 20 to be extracted from the insulating sheath 12.

The embodiment of the invention described herein provides the advantage that the load bearing member 20 does not curl up when extracted from the insulating sheath 12.

FIGS. 4 to 8 show the first connector 104 for connecting the insulated electric cord 102 to the electric device 106. The first connector 104 is in the form of a clamping arrangement.

The first connector 104 comprises a body 36 having a cylindrical outer surface 38 and an end face 40. The body 36 includes a radially outwardly extending flange portion 41 adjacent the end face 40, the cylindrical outer surface 38 extends from the flange portion 41 to the opposite end of the body 36.

The body 36 defines a main passage 42 having an opening 44 in the end face 40. The first end portion 20A of the load bearing member 20 can be received in the main passage 42 via the opening 44. The body 36 has an axially extending projection 43 that projects beyond the end face 40. The projection 43 is provided to mount a cap 120 on the body 36 (see below).

The body 36 defines a threaded clamping passage 46 extending at a right angle to the main passage 42, and communicating therewith. The clamping passage 46 extends to a side opening 48 in the cylindrical outer surface 38.

A clamping member 50, in the form of a grub screw, can be screwed into the clamping passage 46 via the side opening 48. The clamping member 50 is screwed into the clamping passage until it engages and clamps the first end portion 20A of the load bearing member 20 in the main passage 42, thereby securing the insulated electric cord 102 to the first connector 104.

The body 36 defines a conductor receiving passage 52 for receiving the electrical conductors 14, 16, 18 therethrough. The conductor receiving passage 52 extends through the body 36 so that the conductors 14, 16, 18 can be electrically connected to the electrical device 106.

A thread is provided around the cylindrical outer surface 38. The thread extends along the cylindrical outer surface 38 from the flange portion 41 to the opposite end of the body 36.

In order to secure the first connector 104 to the electrical device 106, the threaded region of the body 36 is inserted through an aperture 54 in an upper region of the electrical device 106 so that the flange portion 41 engages a region of the electrical device 106 around the aperture 54. A nut 56 can be screwed onto the cylindrical outer surface 38 and tightened against said region of the electrical device 106 around the aperture 54, thereby securing the first connector 104 to the electrical device 106.

Figure 9:
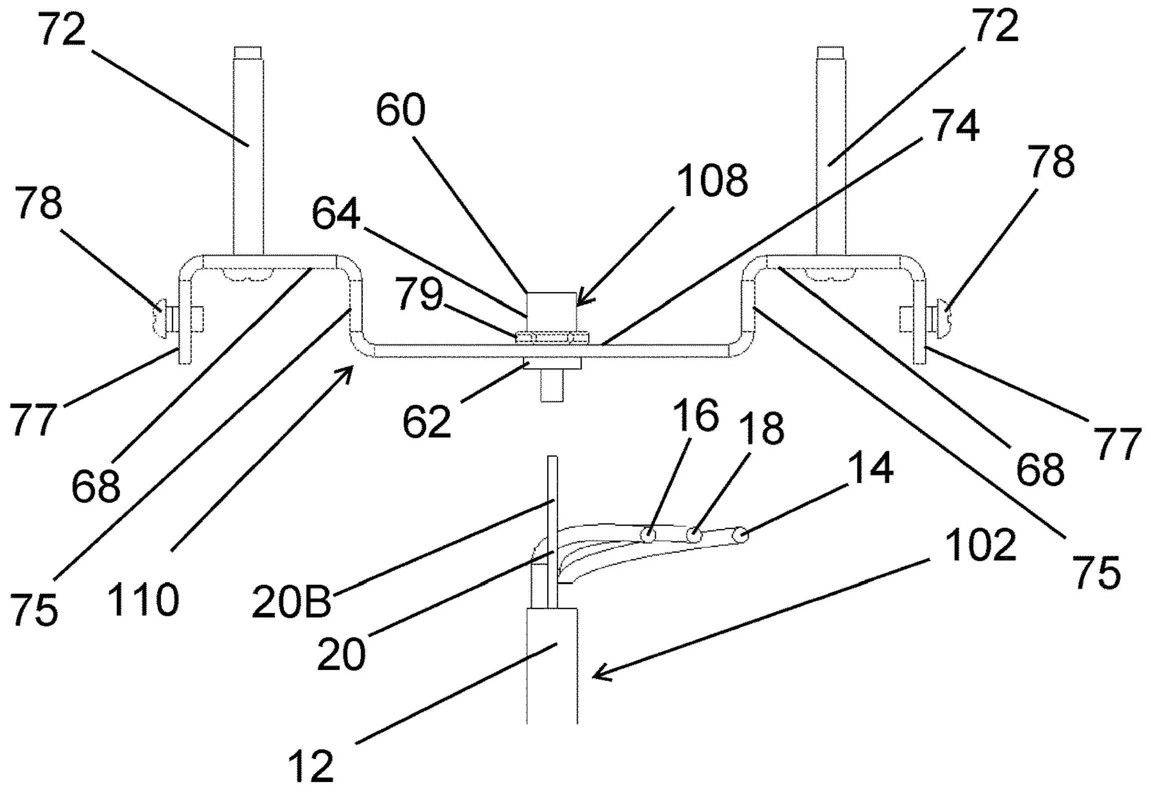
FIG. 9 is a side view showing a carrying member and a second connector, in which the insulated electric cord is about to be connected to the second connector.
Figure 10:
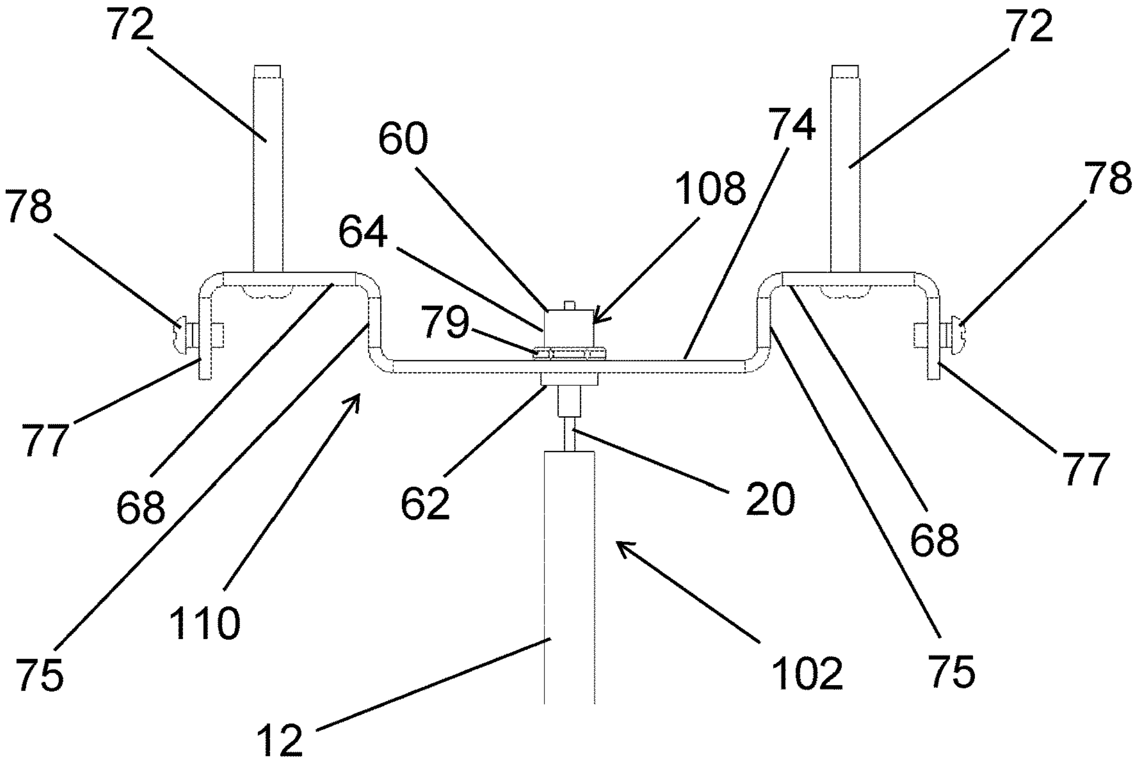
FIG. 10 is a side view showing the carrying member and the second connector, in which the insulated electric cord is connected to a second connector.
Figure 11:
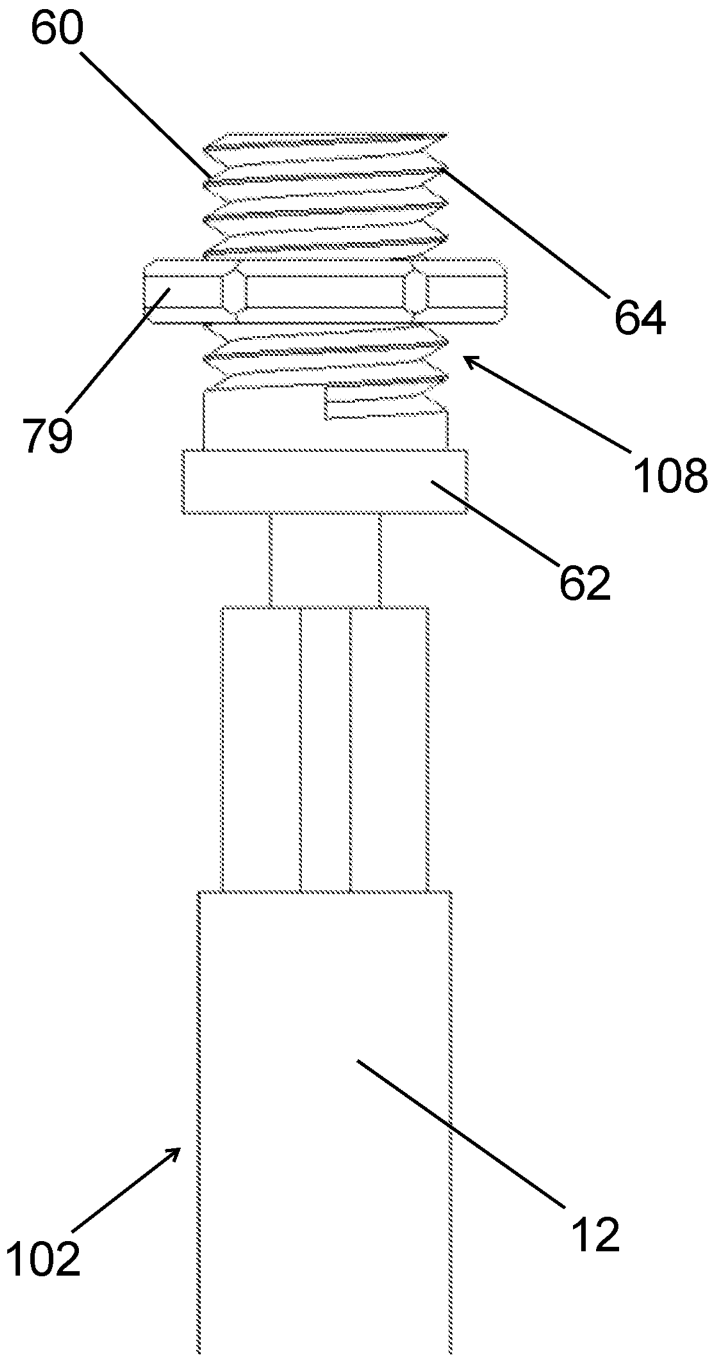
FIG. 11 is a side view, showing the second connector with the insulated electric cord secured thereto.

FIGS. 9 to 11 show the second connector 108 for connecting the insulated electric cord 102 to the carrying member 110. The second connector 108 is in the form of a gripping arrangement comprising a main part 60. The main part 60 has a radially outwardly extending flange 62 at one end of the main part 60. The main part 60 has a cylindrical threaded region 64 extending from the flange 62 to the opposite end of the main part 60.

FIGS. 9 and 10 show a carrying member 110 attached to the support 112. The support 112 may comprise, for example, a ceiling of a building or a beam in a roof of a building.

The carrying member 110 is in the form of a bracket and comprises two recessed attaching portions 68 that engage the support 112. Each of the attaching portions 68 is in the form of a substantially planar member. The attaching portions 68 define respective apertures through which attaching members 72, in the form of screws, are inserted. The attaching members 72 are screwed into the support 112, thereby attaching the carrying member 110 to the support 112.

The carrying member 110 further includes a central securing portion 74 defining a central aperture 76 (see FIG. 11) through which the second connector 108 is received. The central securing portion 74 is in the form of a substantially planar member. The central securing portion 74 is spaced from the attaching portions 68, and thereby from the support 112, to allow the second connector 108 to be secured thereto.

A respective bridging portion 75 extends between each of the attaching portions 68 and the central securing portion 74. The bridging portions 75 are in the form of substantially planar members.

The carrying member 110 further includes an end member 77 at each opposite end thereof. A respective fastening member 78 is provided at each of the end members 77. The fastening members 78 are screws received in opposite holes defined by the carrying member.

The cylindrical threaded region 64 of the second connector 108 is received through the central aperture 76 of the carrying member 110 so that the flange 62 engages the region of the securing portion 74 around the central aperture 76. A nut 79 is screwed onto the threaded region 64 and tightened onto the region of the securing portion 74 around the central aperture 76, thereby securing the second connector 108 to the carrying member 110.

Referring to FIG. 11, in which a sectional view of the second connector 108 is shown, the main part 60 defines a channel 80 to receive the second end portion 20B of the load bearing member 20. The second connector 108 includes three gripping members 82 (only two of which are shown) held by a movable holder 84 within the channel 80. The second connector 108 further includes an urging member 86 for urging the holder 84 in the direction of the arrow A, thereby urging the gripping members 82 to a gripping position in engagement with the load bearing member 20.

The second connector 108 comprises a release member 88 in the form of a projecting portion of the holder 84. The release member 88 is for releasing the gripping members 82 from engagement with the load bearing member 20. When so released, of the position of the load bearing member 20 relative to the second connector 108 can be adjusted.

The release member 88 can be pressed by a user in the direction opposite to that shown by the arrow A to move the holder 84 in the same direction, thereby releasing the gripping members 82 from the load bearing member 20.

Figure 12:
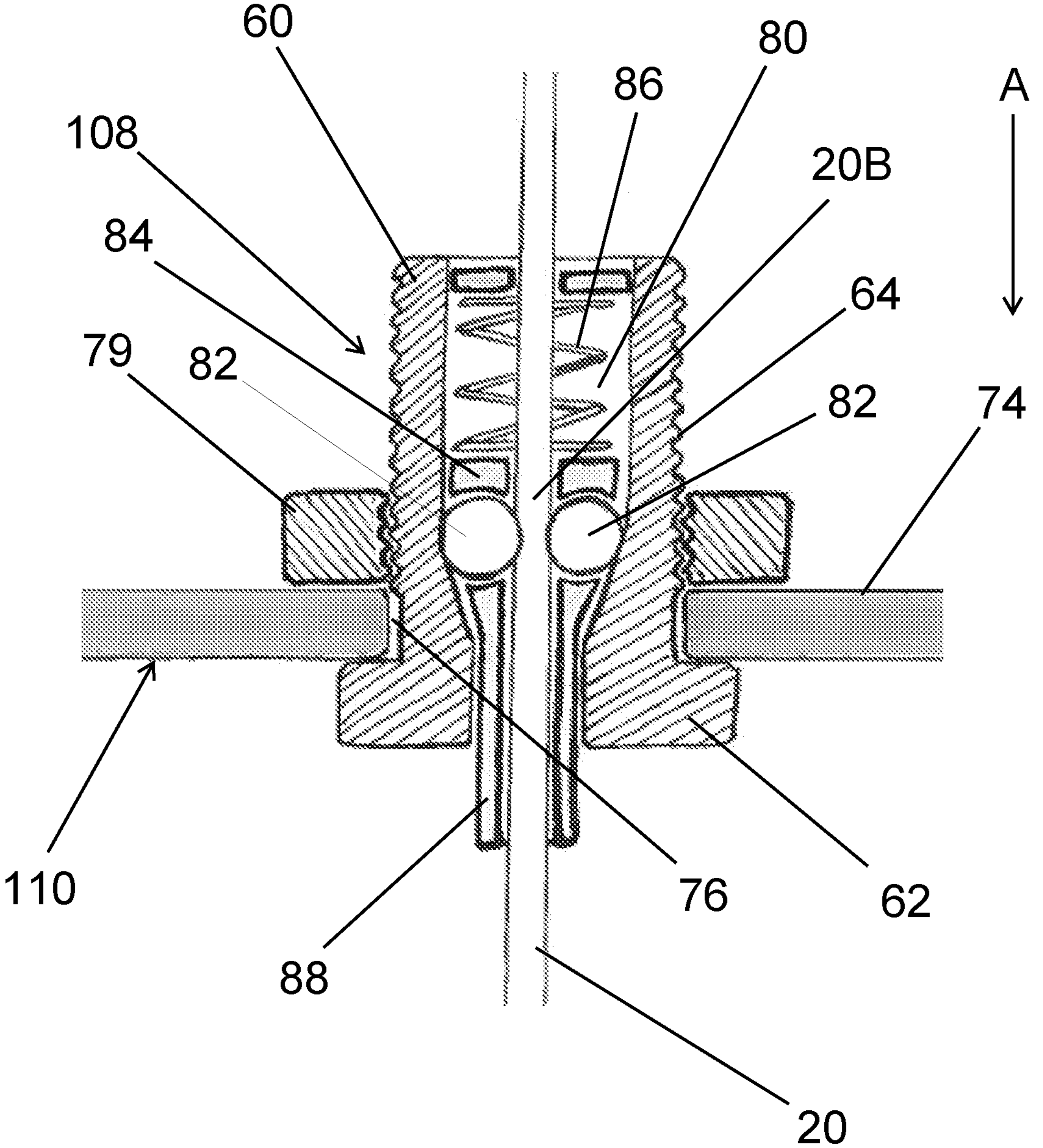
FIG. 12 is a sectional view of the second connector view showing the insulated electric cord connected thereto.
Figure 13:
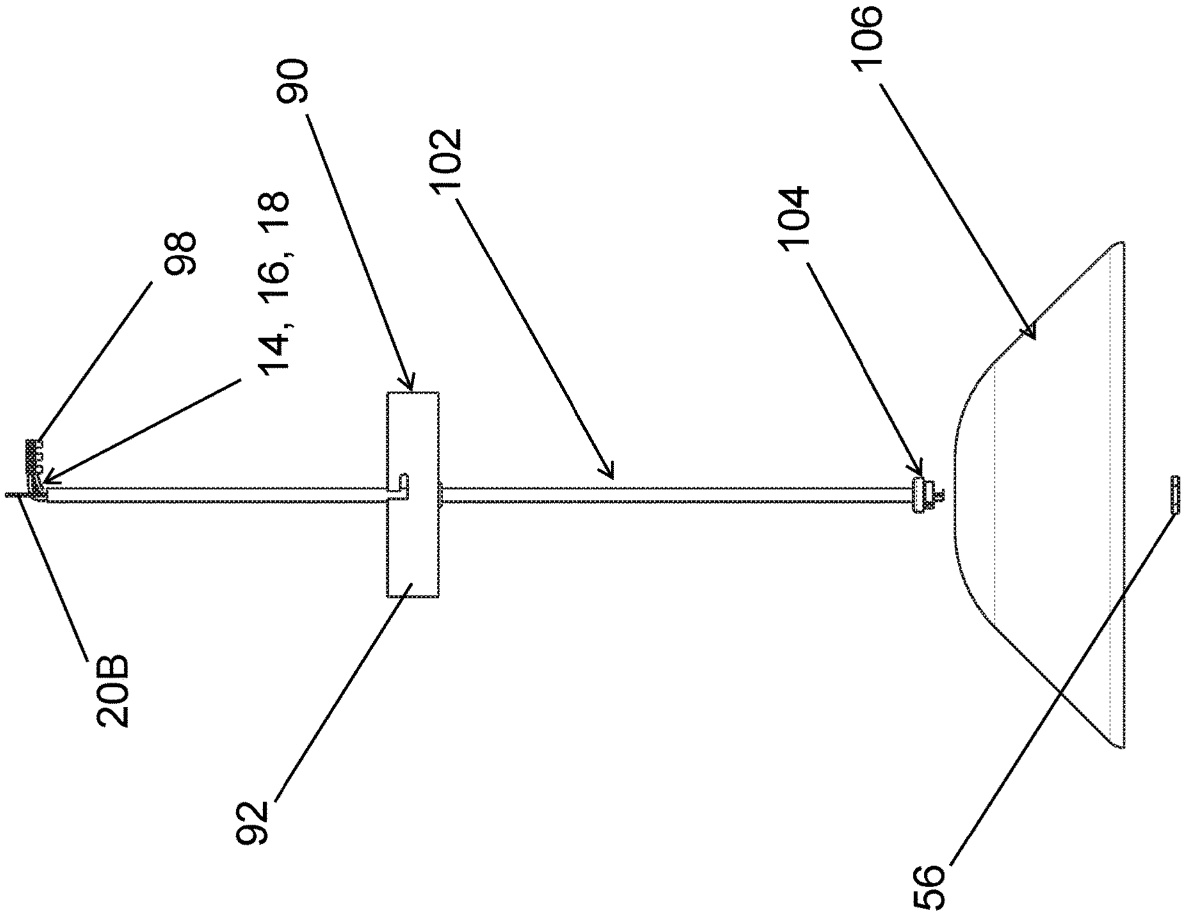
FIG. 13 shows a first step in the installation of an electrical apparatus.
Figure 14:
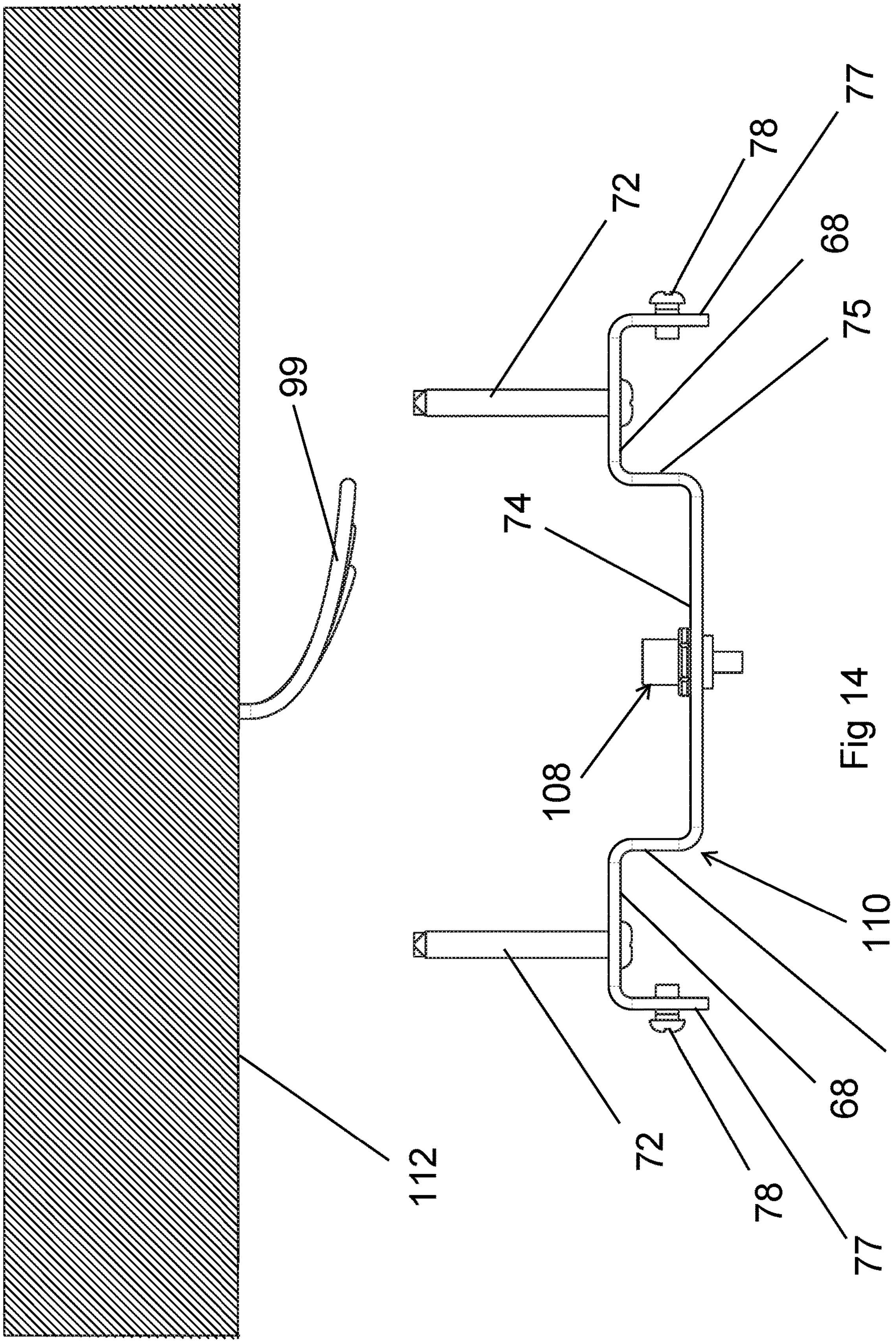
FIG. 14 shows a second step in the installation of an electrical apparatus.
Figure 15:
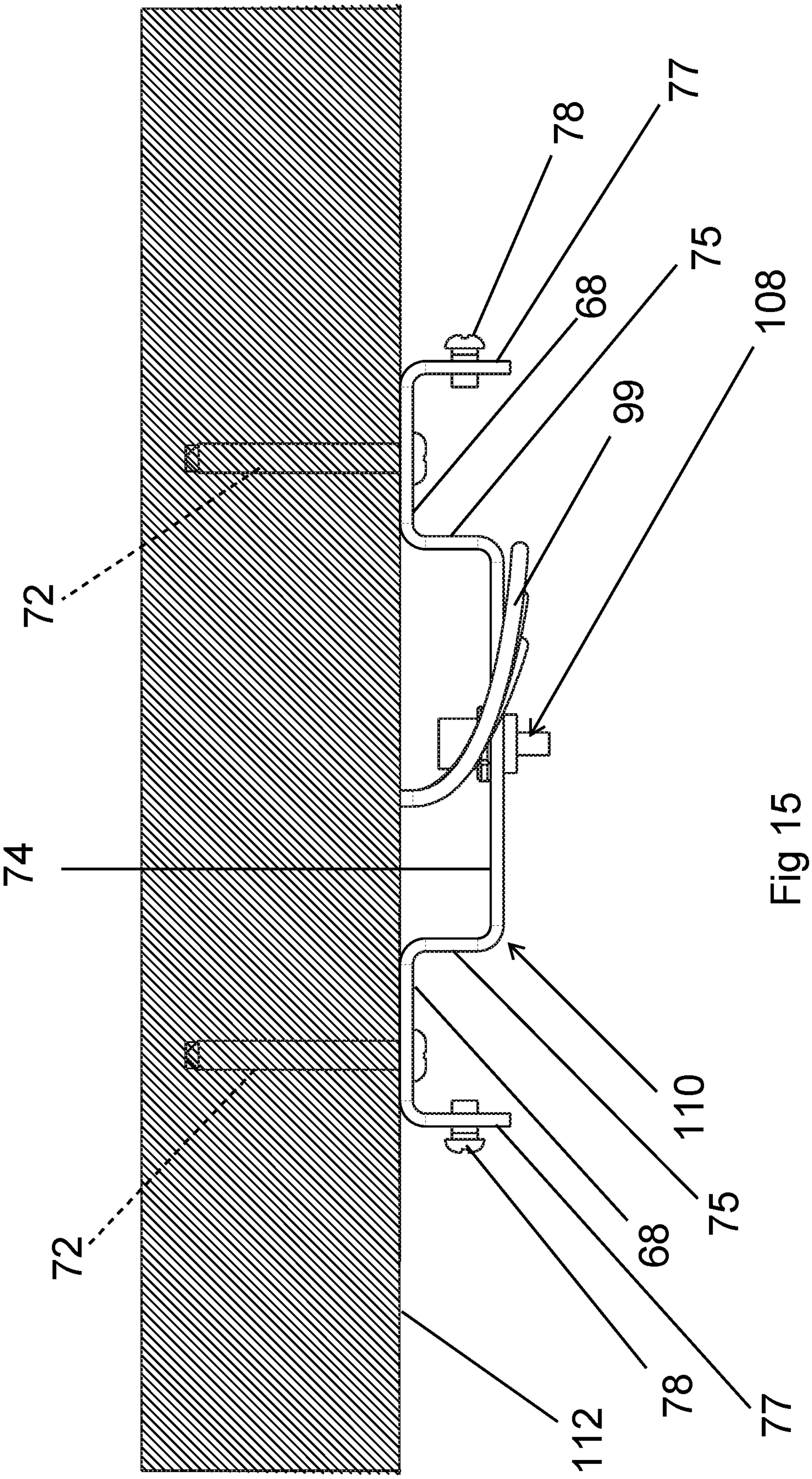
FIG. 15 shows a third step in the installation of an electrical apparatus.
Figure 16:
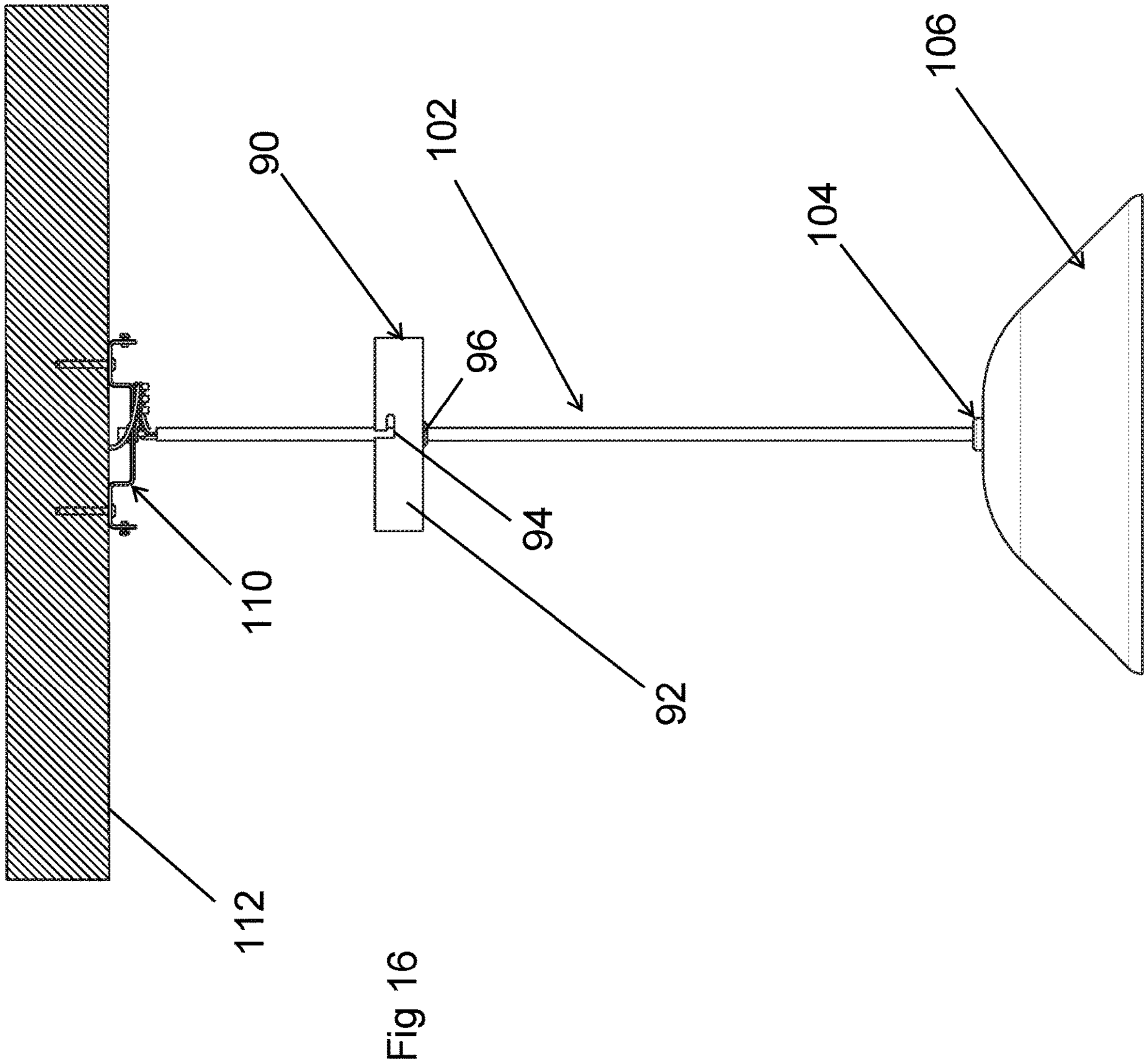
FIG. 16 shows a fourth step in the installation of an electrical apparatus.

FIGS. 12 to 16 show the installation of the electrical apparatus 100. FIG. 12 shows the electrical apparatus 100 prior to installation. FIGS. 12, 15 and 16 show a canopy 90 that is arranged over the carrying member 110. The canopy 90 is described in more detail below.

Initially, the first and second end portions 20A, 20B of the load bearing member 20 are extracted from the insulating sheath 12 by cutting the end regions of the insulating sheath 12. The cut end regions of the insulating sheath 12 are then removed to expose the conductors 14, 16, 18 at each of the opposite ends of the insulated electric cord 102.

Referring to FIG. 13, the conductors 14, 16, 18 at the end of the insulated electric cord 102 at the support 112 are connected to a connecting block 98 in preparation for connection to the cables 99 from a supply of electricity. The conductors 14, 16, 18 at the end of the insulated electric cord 102 at the electrical device 106 are arranged for connection to the electric cables of the electrical device 106.

FIGS. 14 and 15 show the carrying member 110 being attached to the support 112. The attaching members 72 extend through the carrying member 110 and are screwed into the support 112 to attach the carrying member 110 to the support. Cables 99 from a supply of electricity extend from the support 112.

When the first and second end portions 20A, 20B are connected respectively to the first connector 104 and the second connector 108, the electrical device 106 can be suspended on the insulated electric cord 102. The weight of the electrical device 106 is thus supported by the load bearing member 20. The installer can, if necessary, adjust the position of the load bearing member 20 in the second connector 108 by operating the release member 88 until the electrical device is the desired distance from the support 112.

FIG. 16 shows the electrical apparatus 100 attached to the support 112, and the load bearing member 20 supporting the electrical device 106. The cables 99 are then connected to the connecting block 98, and the conductors 14, 16, 18 are electrically connected to the electric device 106.

The canopy 90 is then connected to the carrying member 110. The canopy 90 is in the form of a shallow cylinder having a cylindrical side wall 92 and a circular base member 94. The side wall 92 has opposite L-shaped recesses 94 (only one of which is shown in FIG. 16) that receive the fastening members 78. The fastening members 78 can then be tightened to fasten the canopy 90 to the carrying member 110.

The base member 94 defines an aperture through which the insulated electric cord 102 extends. A sealing member 96 is provided to provide a seal between the insulated electric cord 102 and the base member 94 in the aperture.

Figure 17:
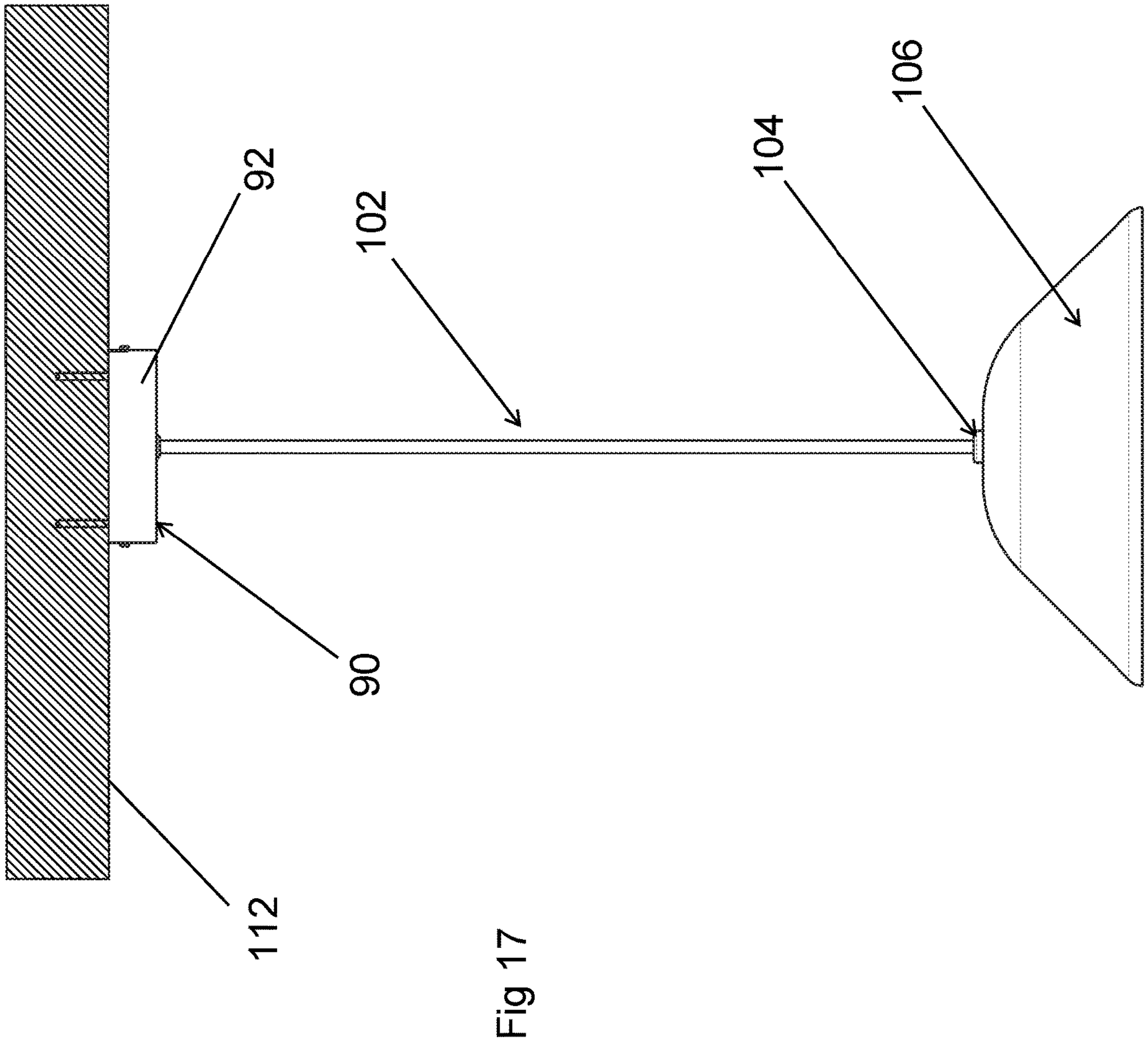
FIG. 17 shows a fifth step in the installation of an electrical apparatus.

FIG. 17 shows the electrical apparatus 100 fully installed, in which the load bearing member 20 is connected to the first connector 104 and to the second connector 108, and the electric device 106 is electrically connected to the source of electricity.

There is thus disclosed an electrical apparatus 100 and an insulated electric cord 102 that suspends an electrical device 106 from a support 112 and allows access to a load bearing member 20 without the problem of the load bearing member 20 curling up. The insulated electric cord 102 also allows the electric device 106 to be suspended while it is electrically connected to a source of electricity.

Various modifications can be made without departing from the scope of the invention.

Figure 18:
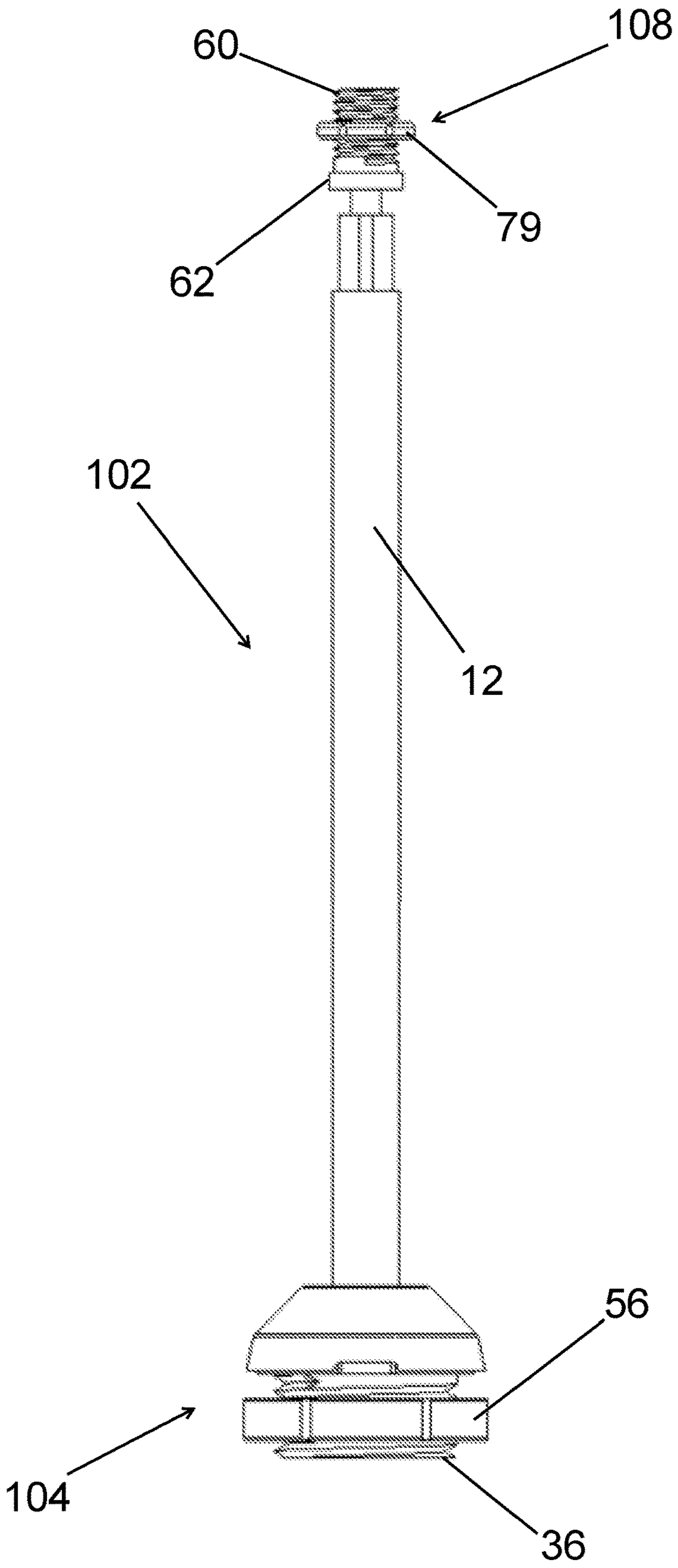
FIG. 18 is a side view of the insulated electric cord secured to a further first connector and to the second connector.
Figure 19:
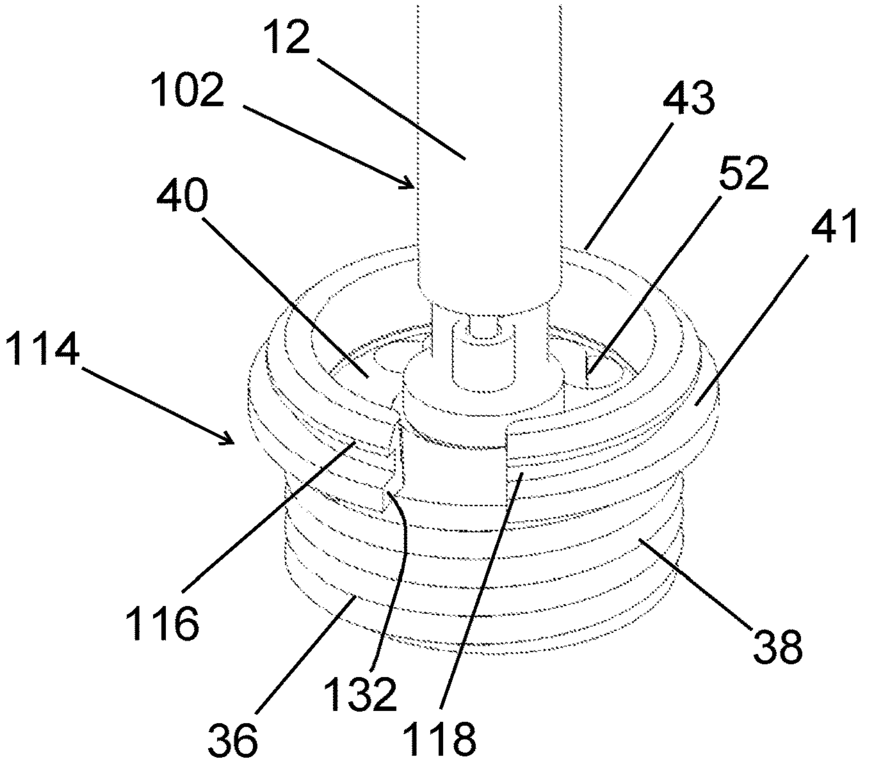
FIG. 19 is a perspective view from above of the further first connector secured to the insulated electric cord.
Figure 20:
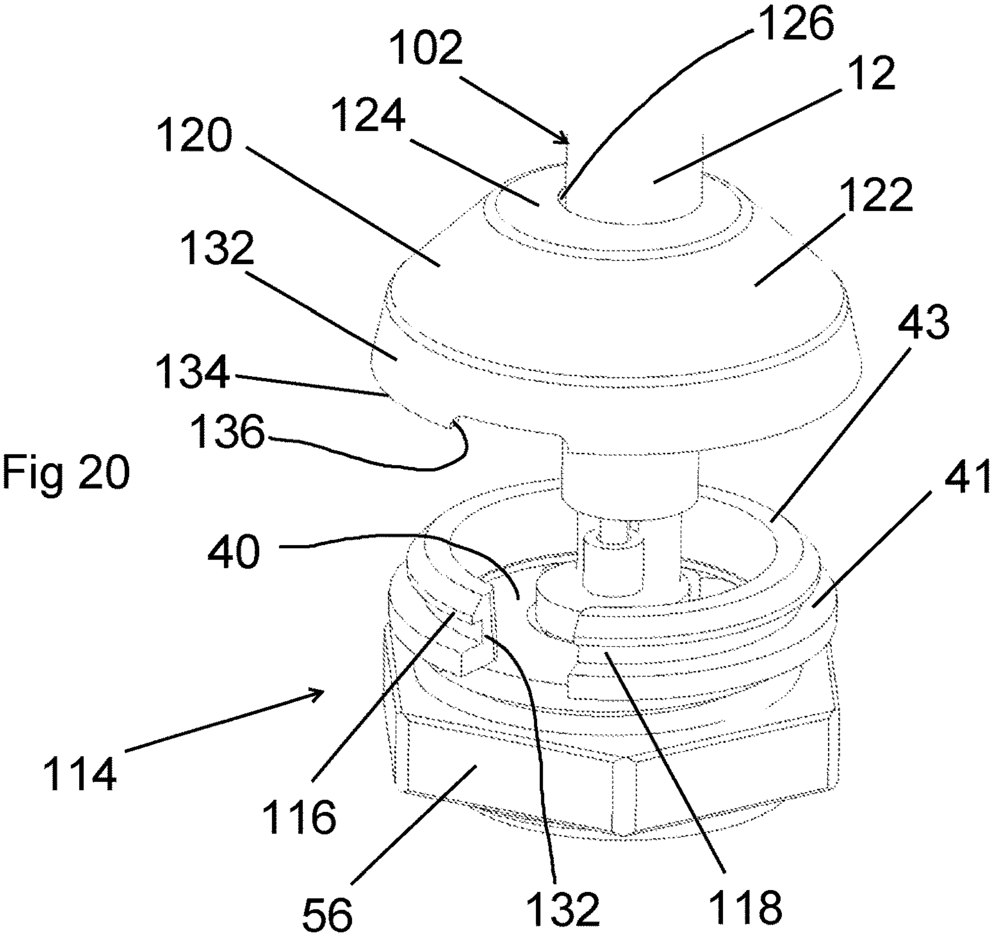
FIG. 20 is a view similar to FIG. 19 of the further first connector showing a cap therefor.
Figure 21:
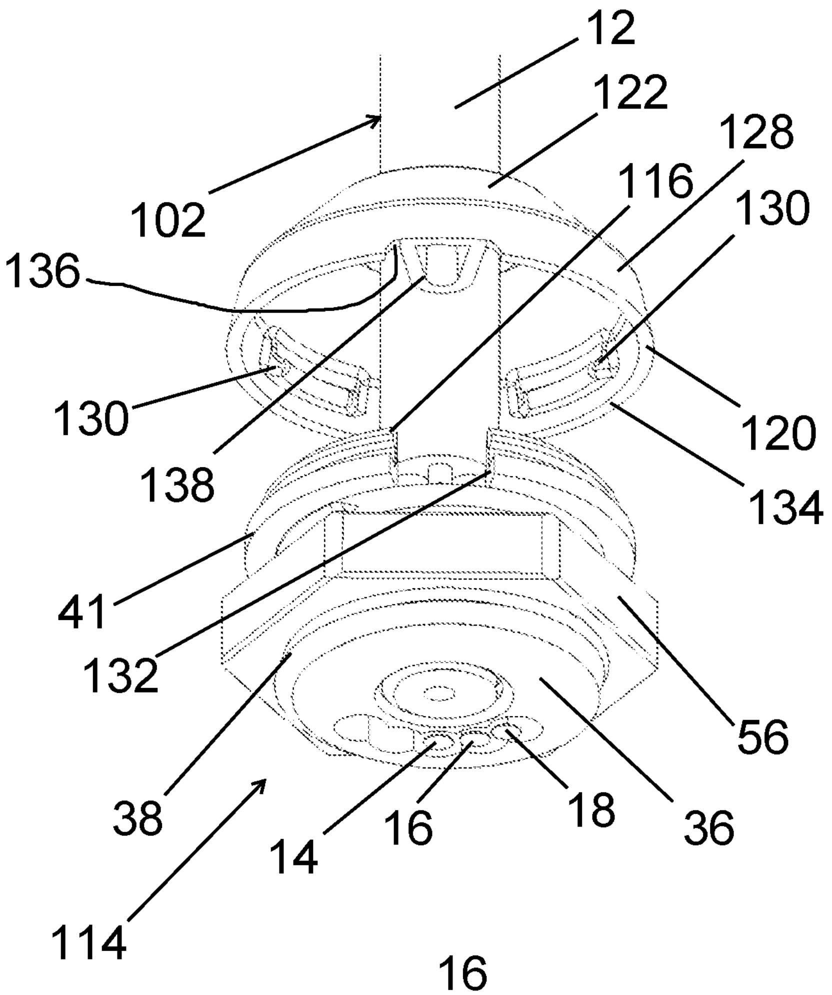
FIG. 21 is a perspective view from below of the further first connector and the cap.
Figure 22:
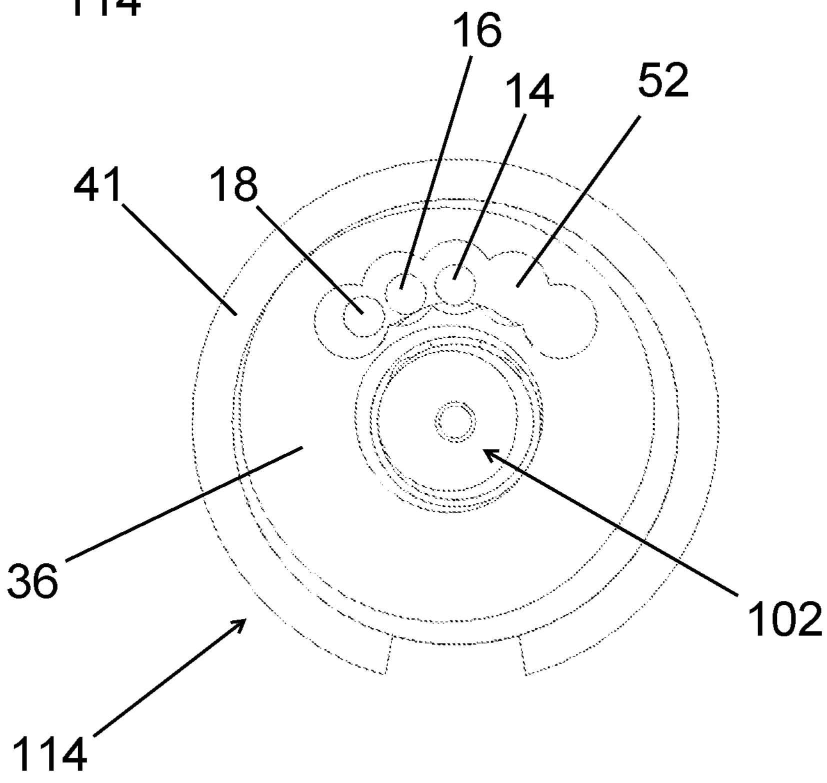
FIG. 22 is a view from below of the further first connector.

FIG. 18 shows the insulated electric cord 102 secured to a further first connector 114 and to the second connector 108. The insulated electric cord 102 shown in FIG. 18 has a larger diameter than the insulated electric cord 102 shown in the previous Figures, but is otherwise the same.

FIGS. 19 to 22 show the further first connector 114, which has many of the same features as the first connector 104 shown in FIGS. 4 to 8 and 13 to 17. These features have been designated in FIGS. 19 to 22 with the same reference numerals as the corresponding features in FIGS. 4 to 8 and 13 to 17.

The further first connector 114 differs from the first connector 102 in that the projection 43 provides an annular lip portion 116 extending radially outwardly. A gap 118 is defined between the lip portion 116 and the flange portion 41.

The further first connector 114 includes a cap 120 mounted on the body 26. The cap 120 has a frustoconical upper part 122 having an apex region 124. The apex region 124 defines an aperture 126 through which the insulated electric cord 102 extends, thereby allowing the cap to be mounted on the main part 36.

The cap 120 also has a skirt portion 128 extending downwardly from the upper part 122. The skirt portion 128 has an inner surface upon which are provided two fixing formations 130 to fix the cap 120 to the main body 36.

The fixing formations 130 are in the form of snap fits which can snap over the lip portion 116 of the main body, and be received in the gap 118 between the lip portion 116 and the flange portion 41.

The projection 43 defines an opening 132. The skirt portion 128 has a lower edge 134 defining a recess 136. A release member 138 is provided in the cap 120 extending inwardly from the recess 136. When the cap 120 is mounted on the body 36, the release member 138 is received in the opening 132.

In use, if it is desired to remove the cap 120, the user can insert his or her finger into the recess 136 to engage the release member 138. The user can then prise the release member 138 away from the body 36, thereby causing the fixing formations 130 to be released from the gap 118, and the cap 120 to be lifted off the main body 36.

The invention claimed is:

1. An electrical apparatus comprising:

an insulated electric cord comprising:

an elongate insulating sheath;

first and second elongate electrical conductors held within the insulating sheath, the elongate electrical conductors extending longitudinally through the insulating sheath;

an elongate load bearing member held within the insulating sheath, the elongate load bearing member extending longitudinally through the insulating sheath;

an elongate flexible cutter held within the insulating sheath, the elongate flexible cutter extending longitudinally through the insulating sheath adjacent the elongate load bearing member;

wherein the cutter is capable of cutting the insulating sheath, thereby allowing a portion of the load bearing member to be extracted from the insulating sheath;

and the electrical apparatus further comprises an electrical device having a first connector, and a carrying member having a second connector;

the first and second elongate electrical conductors connecting the electrical device to wiring of a main supply of electricity at the carrying member;

the elongate load bearing member being connected at the first end portion thereof to the first connector of the electrical device and said elongate load bearing member being connected at the second opposite end portion thereof to the second connector of the carrying member;

wherein the first connector comprises a clamp arrangement having a body defining a main passage in which the first end portion of the load bearing member can be received, and the first connector further includes a clamp member in the body to clamp the load bearing member in the main passage, thereby securing the electric cord to the first connector;

wherein the second connector comprises a gripping arrangement, the gripping arrangement comprising:

a main part defining a channel to receive the second end portion of the load bearing member;

a gripper held within the channel; and an urger for urging the gripper to a gripping position in engagement with the load bearing member.

2. An electrical apparatus according to claim 1, wherein the insulating sheath defines an elongate cavity extending longitudinally through the insulating sheath, the elongate electrical conductors extending through the elongate cavity.

3. An electrical apparatus according to claim 2, wherein the elongate cavity has a generally triangular end profile, each of the conductors being provided at a respective apex of the triangle and wherein the central axis may extend through the cavity.

4. An electrical apparatus according to claim 3, wherein each conductor comprises an elongate electrically conductive core, and an elongate insulator extending around the electrically conductive core.

5. An electrical apparatus according to claim 1, wherein the flexible cutter extends through the insulating sheath adjacent the load bearing member.

6. An electrical apparatus according to claim 1, wherein the insulating sheath has a longitudinal central axis, the load bearing member extending through the insulating sheath offset from the central axis of the insulating sheath, and the flexible cutter is provided between the load bearing member and the electrical conductors.

7. An electrical apparatus according to claim 1, wherein the flexible cutter is provided between the load bearing member and the centre of the insulating sheath.

8. An electrical apparatus according to claim 1, wherein the clamp member is screwed into a clamping passage in the body, the clamping passage communicating with the main passage, thereby allowing the clamp member to engage the load bearing member.

9. An electrical apparatus according to claim 8, wherein the clamping passage is threaded, and the clamp member comprises a screw that can be screwed into the clamping passage.

10. An electrical apparatus according to claim 1, wherein the body defines at least one conductor receiving passage for receiving the electrical conductors.

11. An electrical apparatus according to claim 1, wherein the body includes securing formations for securing the body to the electrical device, the securing formations being threads on which a nut can be threaded to secure the first connector to the electrical device.

12. An electrical apparatus according to claim 1, wherein the second connector includes a plurality of the grippers, said grippers being capable of being urged by the urger into the gripping position in which each gripper engages the load bearing member.

13. An electrical apparatus according to claim 12, wherein the second connector comprises a release member for releasing the load bearing member from the second connector, the release member being depressible to release the, or each, gripper from engagement with the load bearing member.

14. An electrical apparatus according to claim 13, wherein the release member being depressible to move the, or each, gripper to a non-gripping position, whereby in the non-gripping position, the, or each, gripper is released from engagement with the load bearing member.

15. An electrical apparatus according to claim 13, wherein the second connector comprises a holder for holding the, or each, gripper, the release member being provided on the holder, the release member being depressible to move the holder, thereby moving the, or each, gripper to the non-gripping position.

16. A method of installing the electrical apparatus as claimed in claim 1, said method comprising:

providing the first connector for the electrical device;

providing the carrying member;

providing the second connector;

cutting a portion of the insulating sheath at the first end portion of the load bearing member using the cutter;

extracting the first end portion of the load bearing member from the insulating sheath; and securing the first end portion of the load bearing member to the first connector;

cutting a portion of the insulating sheath at the opposite second end portion of the load bearing member using the cutter;

extracting the second end portion of the load bearing member from the insulating sheath;

securing the second end portion of the load bearing member to the second connector; and thereafter electrically connecting the first and second elongate electrical conductors to a supply of electricity at the carrying member.

17. A method according to claim 16, wherein the step of securing the load bearing member to the second connector comprises feeding the load bearing member into the second connector and allowing the, or each, gripper to grip the load bearing member.

* * * * *